United States Patent [19]

Khare et al.

[11] Patent Number: 5,726,117
[45] Date of Patent: Mar. 10, 1998

[54] SORBENT COMPOSITIONS CONTAINING ZINC SUBJECTED TO A STEAM TREATMENT

[75] Inventors: Gyanesh P. Khare; Donald H. Kubicek, both of Bartlesville, Okla.

[73] Assignee: Phillips Petroleum Company, Bartlesville, Okla.

[21] Appl. No.: 483,358

[22] Filed: Jun. 7, 1995

[51] Int. Cl.$^6$ .................. B01J 20/00; B01J 20/02
[52] U.S. Cl. .................. 502/400; 502/405; 502/407; 502/411; 502/415
[58] Field of Search .................. 502/407, 342, 502/307, 400, 405, 411, 415

[56] References Cited

U.S. PATENT DOCUMENTS

| | | | |
|---|---|---|---|
| 3,898,091 | 8/1975 | Stout | 106/48 |
| 4,088,735 | 5/1978 | County et al. | 423/230 |
| 4,088,736 | 5/1978 | Courty et al. | 423/230 |
| 4,208,613 | 6/1980 | Hase et al. | 313/495 |
| 4,990,318 | 2/1991 | Kidd | 423/230 |
| 5,026,672 | 6/1991 | Bayard | 501/134 |
| 5,045,522 | 9/1991 | Kidd | 502/405 |
| 5,053,374 | 10/1991 | Absil et al. | 502/64 |
| 5,102,854 | 4/1992 | Delzer et al. | 502/410 |
| 5,202,213 | 4/1993 | Nakahara et al. | 430/110 |
| 5,248,489 | 9/1993 | Kidd et al. | 423/220 |

FOREIGN PATENT DOCUMENTS 0 553 796 A1  8/1993  European Pat. Off.  ......... B01J 20/06

*Primary Examiner*—Glenn Caldarola
*Assistant Examiner*—In Suk Bullock
*Attorney, Agent, or Firm*—Carl D. Corvin

[57] ABSTRACT

A sorbent composition is provided comprising: (a) a zinc component; (b) a colloidal oxide component; and (c) a metal oxide component. This sorbent composition can be subjected to a steaming treatment that improves its sulfur loading capability.

100 Claims, No Drawings

SORBENT COMPOSITIONS CONTAINING ZINC SUBJECTED TO A STEAM TREATMENT

BACKGROUND

This invention relates to the field of sorbent compositions.

The removal of sulfur from fluid streams has long been desirable, as well as necessary, for a variety of reasons. If a sulfur-containing-fluid-stream is to be released as a waste stream, removal of such sulfur from the fluid stream is often necessary to meet certain environmental regulations. If a sulfur-containing-fluid-stream is to be used in a catalytic process, removal of such sulfur is often necessary to prevent catalyst poisoning.

During sulfur removal processes these sorbents eventually become so loaded with sulfur that their ability to remove sulfur from a sulfur-containing-fluid-stream is greatly diminished. Consequently, these sorbents are subjected to a regeneration process that regenerates the sorbent. However, the gases used to regenerate these sulfur-loaded sorbents usually contain steam. This steam can greatly decrease the effectiveness of such sorbents in their sulfur removing capabilities.

SUMMARY

It is an object of this invention to provide a sorbent composition.

It is another object of this invention to provide a sorbent composition that has been subjected to a steaming treatment.

It is another object of this invention to provide a process to make a sorbent composition.

It is another object of this invention to provide a process to use a sorbent composition.

In accordance with this invention a sorbent composition is provided comprising: (a) a zinc component; (b)) a colloidal oxide component; and (c) a metal oxide component.

In accordance with this invention a sorbent composition is provided comprising: (a) a zinc component; (b) a colloidal oxide component; and (c) a metal oxide component; wherein said sorbent composition is subjected to a steaming treatment.

In accordance with this invention a process is provided comprising: (a) contacting a zinc component, a colloidal oxide component, and a metal oxide component, together; and then (b) subjecting the composition produced in (a) to a steaming treatment where said steaming treatment is conducted at a temperature in the range of about 100° to about 1100° C.

In accordance with this invention a process is provided to remove from a sulfur containing fluid stream. This process comprises contacting said sulfur-containing-fluid-stream with a composition comprising a zinc component, a colloidal oxide component, and a metal oxide component.

DETAILED DESCRIPTION OF THE INVENTION

Sorbent compositions of this invention comprise (or optionally, consist essentially of, or consist of) a zinc component, a colloidal oxide component, and a metal oxide component.

Generally, the zinc component is zinc oxide. However, it may be a compound that is convertible to zinc oxide under the conditions of preparation described herein. Examples of such compounds include, but are not limited to, zinc sulfide, zinc sulfate, zinc hydroxide, zinc carbonate, zinc acetate, and zinc nitrate. The amount of the zinc component present in the sorbent composition is in the range of about 10 to about 90 weight percent based on the total weight of the sorbent composition. However, an amount in the range of about 25 to about 75 weight percent is preferred and an amount in the range of about 40 to about 60 weight percent is most preferred.

The colloidal oxide component is generally a liquid medium comprising finely divided, colloidal-sized particles of a metal oxide. These particles are, in general, homogeneously distributed throughout the liquid medium. The size of these particles varies, but in general, the size of these particles is in the range of about 10 to about 10,000 angstroms. Typical solid concentrations in such colloidal oxide components can range from about 1 to about 30 weight percent based on the total weight of the colloidal oxide component. The pH of the colloidal oxide component can range from about 2 to about 11 depending on the method of preparation of the colloidal oxide component. In another embodiment, the colloidal oxide can be a solid comprising particles of a metal oxide. For example, the colloidal oxide can be a powder comprising particles of a metal oxide. However, when the colloidal oxide is a solid comprising particles of a metal oxide, it should have the ability to be readily dispersed in a liquid medium. In other words, if the colloidal oxide component is a solid comprising particles of a metal oxide, then under the conditions of preparation described herein, the colloidal oxide should be able to form a dispersion that contains colloidal-size particles. The metal oxide, in a preferred embodiment, is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures of two or more thereof. Currently, in a more preferred embodiment, the colloidal oxide component comprises colloidal alumina, colloidal silica, or mixtures thereof. The amount of metal oxide present in the sorbent composition from the colloidal oxide component is in the range of about 1 to about 30 weight percent based on the total weight of the sorbent composition. However, an amount in the range of about 1 to about 20 weight percent is preferred and an amount in the range of about 5 to about 15 weight percent is most preferred.

The metal oxide component can be a metal silicate, a metal aluminate, a metal aluminosilicate, or a mixture thereof. The metal in the metal oxide component can be selected from the group consisting of beryllium, magnesium, calcium, strontium, barium, radium, zinc, cadmium, mercury, and mixtures thereof. However, magnesium, calcium, zinc and mixtures thereof are more preferred, and zinc is most preferred. Examples of such metal oxide components include, but are not limited to, magnesium silicate, calcium silicate, dicalcium silicate, zinc silicate, calcium aluminate, and zinc aluminate. The amount of the metal oxide component present in the sorbent composition is in the range of about 5 to about 90 weight percent based on the total weight of the sorbent composition. However, an amount in the range of about 10 to about 75 weight percent is preferred and an amount in the range of about 15 to about 60 weight percent is most preferred. In another embodiment, the metal oxide component can be formed in-situ during the preparation of the sorbent composition. For example, zinc oxide and silica can be contacted together during the preparation of the sorbent and subjected to a thermal and\or hydrothermal treatment thereby forming a metal oxide component that comprises zinc silicate.

The above three components can be contacted together in any manner known in the art. Additionally, they can be contacted in any order. The components, after initially contacting them together, can be agglomerated by any manner known in the art. This agglomeration can include a sizing step where a desired particle size distribution can be obtained. Additionally, such sizing operations can be conducted after any drying or calcining operation.

Usually, after the components are agglomerated, they are subjected to a drying step. This drying step is generally used to remove the liquid medium of the colloidal oxide component. The drying step can be conducted at any temperature suitable for removing substantially all of the liquid medium. These temperatures are generally in the range of about 50° to about 300° C. However, it is more preferred if the temperature is in the range of about 100° to about 200° C. Drying times depend upon the liquid medium and the drying temperature, but in general, drying times of about 0.5 to about 4 hours are preferred.

The dried composition can then be calcined to form a calcined composition. The calcination can be conducted under any suitable conditions that remove residual water, oxidize any combustibles and\or form a metal oxide component. The dried composition can be calcined in an oxygen containing ambient. Generally, the temperature that the calcination takes place at is in the range of about 300° to about 1300° C. However, it is more preferred if the temperature is in the range of about 450° to about 1100° C. The calcination should be conducted for a period of time in the range of about 0.5 to about 24 hours. Generally, any zinc component that is not in the form of zinc oxide can be converted to zinc oxide at this point of the preparation. Furthermore, zinc oxide and silica can be combined to form zinc silicate at this point of the preparation.

It is sometimes desirable to have the sorbent composition include a Group VIII metal oxide promoter. These promoters can improve the physical and chemical properties of the sorbent composition. For example, these Group VIII metal oxide promoters can increase the ability of the sorbent composition to hydrogenate sulfur oxide to hydrogen sulfide. Furthermore, such promoters can increase the ability of the sorbent composition to regenerate after becoming spent in a sulfur removal process. Examples of suitable Group VIII metal oxide promoters include, but are not limited to, iron oxide, cobalt oxide, nickel oxide, ruthenium oxide, rhodium oxide, palladium oxide, osmium oxide, iridium oxide, and platinum oxide. The amount of promoter in the sorbent composition is in the range of about 0.1 to about 20 weight percent based on the weight of the sorbent composition. However, it is more preferable if the amount is in the range of about 1 to about 15 weight percent, and most preferably the amount is in the range of about 5 to about 10 weight percent.

The promoter can be added to the sorbent composition in the form of the elemental metal, metal oxide, and\or metal-containing compounds that are convertible to metal oxides under the calcining conditions described herein. Some examples of such metal-containing compounds include metal acetates, metal carbonates, metal nitrates, metal sulfates, metal thiocyanates and mixtures of any two or more thereof.

The elemental metal, metal oxide, and\or metal-containing compounds can be added to the sorbent composition by any method known in the art. One such method is the impregnation of the sorbent composition with a solution, either aqueous or organic, that contains the elemental metal, metal oxide, an\or metal-containing compounds. After the elemental metal, metal oxide, and\or metal-containing compounds have been added to the sorbent composition, the promoted composition is dried and calcined, as described hereinafter.

The elemental metal, metal oxide, and\or metal-containing compounds can be added to the sorbent composition as components of the original mixture, or they can be added after the sorbent composition has been dried and calcined. If the metal oxide promoter is added to the sorbent composition after it has been dried and calcined, then the now-promoted composition is dried and calcined a second time. The now-promoted composition is preferably dried at a temperature in the range of about 50° to about 300° C., but more preferably, the drying temperature will range from about 100° to about 250° C., for a period of time in the range of about 0.5 to about 8 hours, more preferably in the range of about 1 to about 5 hours. The dried, promoted composition is then calcined in the presence of oxygen or an oxygen-containing gas at a temperature in the range of about 300° to about 800° C., and more preferably in the range of from about 450° to about 750° C., until volatile matter is removed and until at least a portion of the elemental metal and\or the metal-containing compounds is converted to a metal oxide. The time required for this calcining step will generally be in the range of about 0.5 to about 4 hours, and will preferably be in the range of from about 1 to about 3 hours.

In another embodiment of this invention, the sorbent composition is subjected to a steaming treatment. This steaming treatment comprises contacting the sorbent composition with a steam mixture that comprises water and air. If desired, this mixture can contain other gases such as, for example, nitrogen, helium, and argon. The steam mixture should contain about 5 to about 90 volume percent water, the remainder comprising air. Preferably, the steam mixture should contain about 10 to 80 volume percent water, the remainder comprising air. The steaming treatment should be conducted at a temperature in the range of about 100° to about 1100° C. However, it is preferred if the steaming treatment is conducted at a temperature in the range of about 200° to about 900° C. Generally, the amount of time that the steam mixture is contacted with the sorbent composition will depend on the temperature the steaming treatment is conducted at. However, the amount of time that the steam mixture is contacted with the sorbent composition is from about 1 to about 24 hours and preferably from about 2 to about 8 hours. The steam treatment can take place either before, or after, incorporating a Group VIII metal oxide promoter. Additionally, one or more steaming treatments can be conducted to obtain a desired sorbent composition. Furthermore, the sorbent composition to be subjected to the steaming treatment can be in the form of a dry powder that is contacted with the steam mixture, or it can be in the form of a water containing sorbent composition that is subjected to the above-identified temperatures.

The sorbent compositions of this invention can be used in sulfur removal processes where there is achieved a contacting of the sorbent composition with a sulfur-containing gaseous feed stream, and thereafter, of the sorbent composition with oxygen or an oxygen-containing gas, which is utilized to regenerate the sorbent composition. The sulfur removal process is in no way limited to the use of a particular apparatus. The sulfur removal process can be carried out using a fixed bed of sorbent composition, a fluidized bed of sorbent composition, or a moving bed of sorbent composition. Examples of such sulfur removal processes are disclosed in U.S. Pat. Nos. 4,990,318; 5,077,261; 5,102,854; 5,108,975; 5,130,288; 5,174,919; 5,177,050; 5,219,542; 5,244,641; 5,248,481; and 5,281,445; the disclosures of which are hereby incorporated by reference. The sorbent compositions of this invention are useful in sulfur removal processes that are conducted at temperatures from about 300° to about 800° C. Additionally, they are especially useful in sulfur removal processes that are conducted at temperatures greater than about 430° C. but less than about 650° C. Furthermore, the sorbent compositions of this invention are especially useful in sulfur removal processes that are conducted at temperatures in the range of about 475° C. to about 625° C.

EXAMPLES

These examples are provided to illustrate the invention. The particular reactants, conditions, and the like, are meant to be illustrative of the invention and are not meant to be construed as limiting the invention.

Example One

Sorbent Preparation

A sorbent was prepared by dry mixing 158.9 grams of Micro-Cel T-38 calcium silicate (Celite Corporation, Lompoc, Calif.) and 198.6 grams of powdered zinc oxide for 10 minutes in a mix-muller. This composition was then spray impregnated with 197.0 grams of Nyacol Al-20 alumina in 140 grams of deionized water. The resulting material was further mixed for an additional 35 minutes. The resulting wet paste was agglomerated by drying at 150° C. for three hours and calcining at 635° C. for one hour. The dried agglomerates were granulated in a bench top granulator fitted with a 50 mesh screen (Stokes Pennwalt, Warminster, Pa., Model 43 Granulator). Two hundred fifty grams of the granulated material was placed in a rotating mixer and impregnated with 74.27 grams of nickel nitrate dissolved in 135.3 grams of deionized water. This was then dried at 150° C. for one hour and calcined at 635° C. for one hour. The product was screened to remove particles larger than 50 mesh and smaller than 200 mesh. Two hundred fifty grams of the screened product was subjected to a second nickel impregnation using 24.75 grams of nickel nitrate in 122.5 grams of deionized water. This material was dried at 121° C. overnight. The dried product was designated "Sorbent A."

Twenty grams of Sorbent A was placed in a quartz tube and exposed to a mixture of 8.0 cc/hr deionized water, 2500 cc/hr air and 7500 cc/hr nitrogen for 24 hours at 760° C. The resulting material was designated "Sorbent B."

A comparison composition was prepared as follows. Twenty pounds of Celite® powder was placed in a mix muller. While mixing, the Celite®powder was spray impregnated over a period of six to eight minutes with 24.4 pounds of Nyacol Al-20 colloidal alumina using a pump and spray nozzle. To this was added, in small increments, 25.0 pounds of zinc oxide, with mixing for 22–24 minutes. As needed, the sides, blades and wheels of the mixer were scraped to ensure a homogeneous mix. The total mix time including alumina addition did not exceed thirty minutes. The moisture content of the mix was between 26–27%. The mix had a moist, powdery appearance at this point. The mix was then extruded using a screw extruder with water-cooled barrel controlled at 45°–50° C. The extrudate was dried on trays in an air circulating oven at 150° C. for three hours. The dried extrudate was calcined at 635° C. for one hour using a belt calciner. Nickel was then spray impregnated onto the calcined base in a coater using nickel(II) nitrate dissolved in water. The aqueous nickel solution used was prepared by dissolving 134.7 grams of nickel(II) nitrate hexahydrate per pound of calcined base in sufficient water to effect an 85% incipient wetness impregnation. After impregnation, the material was dried at 150° C. for three hours and calcined at 635° C. for one hour. The resulting material was designated "Sorbent C."

A portion of Sorbent C was treated with steam in a quartz tube in a manner analogous to the treatment described above for Sorbent B. The resulting material was designated "Sorbent D."

Sulfur Removal From Gases

In this test, sorbents are alternately contacted at 427°–649° C. with hydrogen sulfide diluted with gases such as carbon dioxide and nitrogen, and at 593°–649° C. with air. During the contact with hydrogen sulfide, the sulfur loading on the sorbent was determined to be complete when hydrogen sulfide was detected at 100 ppm in the effluent. At this point, the regeneration by contact with air was begun. The results are given in Table I.

TABLE I

Sulfur Loading Study Results

| Temperature, °C. | Cycle | Sulfur Loading, % |
|---|---|---|
| Sorbent A | | |
| 427 | 1 | 3.0 |
| 427 | 2 | 3.7 |
| 427 | 3 | 3.1 |
| 538 | 4 | 9.3 |
| 538 | 5 | 10.8 |
| 538 | 6 | 12.7 |
| 649 | 7 | 16.3 |
| 649 | 8 | 15.4 |
| 427 | 9 | 7.0 |
| 427 | 10 | 9.1 |
| 427 | 11 | 10.0 |
| Sorbent B | | |
| 427 | 1 | 1.1 |
| 427 | 2 | 2.1 |
| 427 | 3 | 2.6 |
| 427 | 4 | 2.8 |
| 427 | 5 | 3.1 |
| 427 | 6 | 3.2 |
| 649 | 7 | 15.1 |
| 649 | 8 | 16.5 |
| 649 | 9 | 16.1 |
| 593 | 10 | 14.0 |
| 593 | 11 | 13.2 |
| 593 | 12 | 14.9 |
| 538 | 13 | 13.7 |
| 538 | 14 | 15.4 |
| 538 | 15 | 15.6 |
| Sorbent C | | |
| 427 | 1 | 12.4 |
| 427 | 2 | 14.2 |
| 427 | 3 | 14.3 |
| 427 | 4 | 13.7 |
| 427 | 5 | 13.7 |
| 427 | 6 | 13.7 |
| 427 | 7 | 13.8 |
| 427 | 8 | 13.5 |
| 427 | 9 | 13.3 |
| 427 | 10 | 13.5 |
| 427 | 11 | 13.5 |
| 427 | 12 | 13.5 |

TABLE I-continued

Sulfur Loading Study Results

| Temperature, °C. | Cycle | Sulfur Loading, % |
|---|---|---|
| 427 | 13 | 13.3 |
| 427 | 14 | 13.3 |
| 427 | 15 | 13.7 |
| 427 | 16 | 13.0 |

Sorbent D*

| Temperature, °C. | Cycle | Sulfur Loading, % |
|---|---|---|
| 427 | 1 | 12.8 |
| 427 | 2 | 15.2 |
| 427 | 3 | 14.3 |
| 427 | 4 | — |
| 427 | 5 | 4.2 |
| 538 | 6 | 2.9 |
| 538 | 7 | 8.5 |
| 538 | 8 | 6.4 |
| 538 | 9 | 6.5 |
| 538 | 10 | 5.8 |
| 538 | 11 | 5.5 |

*For Sorbent D, for cycles 3–11, the regeneration gas also contained steam.

A comparison of the data for Sorbents A and B shows that the latter has superior sulfur loading at temperatures greater than about 430° C. but less than about 650° C., indicating a beneficial effect of the steam treatment it received. A comparison of the data for Sorbents C and D shows that the comparison material is similar in behavior when steam is not present in the regeneration gases. However, when steam is included in the regeneration gases for Sorbent D, its sulfur loading decreased significantly.

Example Two

In this example, an inventive preparation is conducted in a manner to produce an inventive sorbent in which the active ingredient, zinc oxide, and the promoter, nickel oxide, are supported in an in-situ formed matrix comprising zinc silicate.

The sorbent was prepared by dry mixing in a mix-muller 1584 grams zinc oxide and 216 grams Celite® silica for 5 minutes. The resulting powder was spray-impregnated with a solution of 250 grams Vista Dispal alumina in 450 grams of deionized water. The resulting wet paste was agglomerated by drying at 150° C. for 3 hours and calcining at 635° C. for one hour. The dried material was granulated in a bench top Stokes Pennwalt Granulator (Model 43, Stokes Penwalt, Warminster, Pa.) fitted with a 50 mesh screen. One hundred fifty-one grams of the −20 to +140 mesh fraction was placed in a quartz reactor and steamed with a mixture of 1.0 cc\min deionized water and 336 cc\min air at 870° C. for 20 hours. One hundred twenty-five grams of the steamed material was then placed in a rotating mixer and impregnated with 37.1 grams of nickel nitrate dissolved in 26.6 grams of deionized water. This material was then dried at 150° C. for one hour and calcined at 635° C. for one hour. The resulting material was designated "Sorbent E." An X-ray diffraction analysis indicated that there was about 22.1 weight percent zinc silicate in the sorbent composition together with zinc oxide and nickel oxide. It is estimated that the sorbent composition also contain some unreacted silica, as well as, the alumina.

Sorbent E was tested for sulfur removal from gases as was indicated previously for Sorbents A–D. The results are given in Table II.

TABLE II

Results with Sorbent E**

| Temperature, °C. | Cycle | Sulfur Loading, % |
|---|---|---|
| 538 | 1 | 22.4 |
| 538 | 2 | 24.4 |
| 538 | 3 | 24.0 |
| 538 | 4 | 23.9 |
| 538 | 5 | 31.9 |
| 538 | 6 | 27.4 |
| 538 | 7 | 24.8 |
| 538 | 8 | 24.8 |
| 538 | 9 | 24.1 |
| 538 | 10 | 24.0 |
| 538 | 11 | 23.7 |
| 538 | 12 | 23.2 |
| 538 | 13 | 22.4 |
| 538 | 14 | 24.1 |
| 538 | 15 | 22.8 |
| 538 | 16 | 21.3 |
| 538 | 17 | 19.2 |
| 538 | 18 | 16.5 |
| 538 | 19 | 17.3 |
| 538 | 20 | 18.5 |
| 538 | 21 | 18.0 |
| 538 | 22 | 16.9 |

**For Sorbent E, for cycles 2–22, the regeneration gas also contained steam.

The data presented in Table II show that Sorbent E is also effective in sulfur removal from gases at high temperatures and under moist conditions. This is in contrast to the severely decreased sulfur loading of Sorbent D when tested under moist conditions. It is noted that while the level of active zinc in Sorbent E is calculated to be 57.5 weight percent vs. 46.6 weight percent for Sorbent D, the 23.4% higher active zinc level of Sorbent E is insufficient to account for the >400% higher level of sulfur loading of Sorbent E after an equivalent number of regeneration cycles with steam (compare cycle 11 of Sorbent D with cycle 12 of Sorbent E, both after nine cycles with steam).

We claim:

1. A sorbent composition comprising:
   (a) a zinc component;
   (b) a colloidal oxide component; and
   (c) a metal oxide component;
wherein said composition has been subjected to a temperature in the range of about 50° C. to about 800° C. to remove substantially all of the liquid medium, and wherein said sorbent composition is then subjected to a steaming treatment that comprises contacting said sorbent composition with a steam mixture that comprises water and air.

2. A sorbent composition according to claim 1 wherein said steam mixture contains about 5 to about 90 volume percent water.

3. A sorbent composition according to claim 1 wherein said steaming treatment is conducted at a temperature in the range of about 100° C. to about 1100° C.

4. A sorbent composition according to claim 1 wherein said zinc component is present in said sorbent composition in an amount from about 25 to about 75 weight percent.

5. A sorbent composition according to claim 4 wherein said zinc component is present in said sorbent composition in an amount from about 40 to about 60 weight percent.

6. A sorbent composition according to claim 1 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

7. A sorbent composition according to claim 6 wherein said colloidal oxide component is used in a quantity that presents an amount of metal oxide in said sorbent composition from about 1 to about 20 weight percent based on the weight of said sorbent composition.

8. A sorbent composition according to claim 6 wherein said colloidal oxide component is used in a quantity that presents an amount of metal oxide in said sorbent composition from about 5 to about 15 weight percent based on the weight of said sorbent composition.

9. A sorbent composition according to claim 1 wherein said metal oxide component contains a metal selected from the group consisting of magnesium, calcium, zinc and mixtures thereof.

10. A sorbent composition according to claim 9 wherein the amount of metal oxide component is present in said sorbent composition in an amount in the range of about 10 to about 75 weight percent based on the weight of said sorbent composition.

11. A sorbent composition according to claim 1 wherein said steam mixture contains about 5 to about 90 volume percent water, and wherein said steaming treatment is conducted at a temperature in the range of about 100° C. to about 1100° C., and wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

12. A sorbent composition according to claim 1 further comprising a Group VIII metal oxide promoter.

13. A composition according to claim 12 wherein said Group VIII metal oxide promoter is selected from the group consisting of cobalt oxide and nickel oxide.

14. A sorbent composition according to claim 12 wherein said Group VIII metal oxide promoter is present in said sorbent composition in an amount in the range of about 1 to about 15 weight percent based on the weight of said sorbent composition.

15. A sorbent composition according to claim 14 wherein said steam mixture contains about 5 to about 90 volume percent water.

16. A sorbent composition according to claim 14 wherein said steaming treatment is conducted at a temperature in the range of about 100 ° C. to about 1100° C.

17. A sorbent composition according to claim 14 wherein said zinc component is present in said sorbent composition in an amount from about 25 to about 75 weight percent.

18. A sorbent composition according to claim 17 wherein said zinc component is present in said sorbent composition in an amount from about 40 to about 60 weight percent.

19. A sorbent composition according to claim 14 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

20. A sorbent composition according to claim 19 wherein said colloidal oxide component is used in a quantity that presents an amount of metal oxide in said sorbent composition from about 1 to about 20 weight percent based on the weight of said sorbent composition.

21. A sorbent composition according to claim 19 wherein said colloidal oxide component is used in a quantity that presents an amount of metal oxide in said sorbent composition from about 5 to about 15 weight percent based on the weight of said sorbent composition.

22. A sorbent composition according to claim 14 wherein said metal oxide component contains a metal selected from the group consisting of magnesium, calcium, zinc and mixtures thereof.

23. A sorbent composition according to claim 22 wherein the amount of metal oxide component is present in said sorbent composition in an amount in the range of about 10 to about 75 weight percent based on the weight of said sorbent composition.

24. A sorbent composition according to claim 14 wherein said steam mixture contains about 5 to about 90 volume percent water, and wherein said steaming treatment is conducted at a temperature in the range of about 100° C. to about 1100° C., and wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quanity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

25. A sorbent composition comprising:
(a) a zinc component;
(b) a colloidal oxide component;
(c) a metal oxide component; and
(d) water wherein said composition has been subjected to a temperature in the range of about 50° C. to about 800° C. to remove substantially all of the liquid medium, and wherein said sorbent composition is then subjected to a steaming treatment that comprises subjecting said sorbent composition with a steam mixture that comprises water and air to a temperature in the range of about 100° C. to about 1100° C.

26. A sorbent composition according to claim 25 wherein said zinc component is present in said sorbent composition in an amount from about 25 to about 75 weight percent.

27. A sorbent composition according to claim 25 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

28. A sorbent composition according to claim 27 wherein said colloidal oxide component is used in a quantity that presents an amount of metal oxide in said sorbent composition from about 1 to about 20 weight percent based on the weight of said sorbent composition.

29. A sorbent composition according to claim 25 wherein said metal oxide component contains a metal selected from the group consisting of magnesium, calcium, zinc and mixtures thereof.

30. A sorbent composition according to claim 29 wherein the amount of metal oxide component is present in said sorbent composition in an amount in the range of about 10 to about 75 weight percent based on the weight of said sorbent composition.

31. A sorbent composition according to claim 25 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quanity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

32. A process to produce a sorbent composition said process comprising:
(a) contacting a zinc component, a colloidal oxide component, and a metal oxide component, together followed by subjecting this contacted composition to a temperature in the range of about 50° C. to about 800° C. to remove substantially all of the liquid medium, and then
(b) subjecting the composition produced in (a) to a steaming treatment wherein said steaming treatment is conducted at a temperature in the range of about 100° to about 1100° C.

33. A process according to claim 32 wherein said steam treatment uses a steam mixture containing about 5 to about 90 volume percent water.

34. A process according to claim 32 wherein said zinc component is present in said sorbent composition in an amount from about 25 to about 75 weight percent.

35. A process according to claim 34 wherein said zinc component is present in said sorbent composition in an amount from about 40 to about 60 weight percent.

36. A process according to claim 32 wherein said colloidal oxide component has a metal oxide selected from the group consisting of alumina, silica, titania, zirconia, tin oxide, antimony oxide, cerium oxide, yttrium oxide, copper oxide, iron oxide; manganese oxide, molybdenum oxide, tungsten oxide, chromium oxide, and mixtures thereof.

37. A process according to claim 36 wherein said colloidal oxide component is used in a quantity that presents an amount of metal oxide in said sorbent composition from about 1 to about 20 weight percent based on the weight of said sorbent composition.

38. A process according to claim 37 wherein said colloidal oxide component is used in a quantity that presents an amount of metal oxide in said sorbent composition from about 5 to about 15 weight percent based on the weight of said sorbent composition.

39. A process according to claim 32 wherein said metal oxide component contains a metal selected from the group consisting of magnesium, calcium, zinc and mixtures thereof.

40. A process according to claim 39 wherein the amount of metal oxide component is present in said sorbent composition in an amount in the range of about 10 to about 75 weight percent based on the weight of said sorbent composition.

41. A process according to claim 32 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

42. A process according to claim 32 wherein said sorbent composition further comprising a Group VIII metal oxide promoter.

43. A process according to claim 42 wherein said Group VIII metal oxide promoter is selected from the group consisting of cobalt oxide and nickel oxide.

44. A process according to claim 42 wherein said Group VIII metal oxide promoter is present in said sorbent composition in an amount in the range of about 1 to about 15 weight percent based on the weight of said sorbent composition.

45. A process according to claim 44 wherein said sorbent composition is subjected to a steaming treatment that comprises contacting said sorbent composition with a steam mixture that comprises water and air.

46. A process according to claim 45 wherein said steam mixture contains about 5 to about 90 volume percent water.

47. A process according to claim 45 wherein said zinc component is present in said sorbent composition in an amount from about 25 to about 75 weight percent.

48. A process according to claim 47 wherein said zinc component is present in said sorbent composition in an amount from about 40 to about 60 weight percent.

49. A process according to claim 42 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

50. A process according to claim 49 wherein said colloidal oxide component is used in a quantity that presents an amount of metal oxide in said sorbent composition from about 1 to about 20 weight percent based on the weight of said sorbent composition.

51. A process according to claim 49 wherein said colloidal oxide component is used in a quantity that presents an amount of metal oxide in said sorbent composition from about 5 to about 15 weight percent based on the weight of said sorbent composition.

52. A process according to claim 49 wherein said metal oxide component contains a metal selected from the group consisting of magnesium, calcium, zinc and mixtures thereof.

53. A process according to claim 52 wherein the amount of metal oxide component is present in said sorbent composition in an amount in the range of about 10 to about 75 weight percent based on the weight of said sorbent composition.

54. A process according to claim 42 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount metal oxide component present in said sorbent composition in an amount in the range of about 10 to about 75 weight percent based on the weight of said sorbent composition.

55. A process to produce a sorbent composition, said process comprising:
(a) contacting a zinc component a metal oxide component, and a colloidal oxide component together and then subjecting this contacted composition to a temperature in the range of about 50° C. to about 800° C. to remove substantially all of the liquid medium and then
(b) subjecting the composition produced in (a) to a steaming treatment wherein said steaming treatment is conducted at a temperature in the range of about 100° C. to about 1100° C.

56. A process according to claim 55 wherein said steam treatment uses a steam mixture containing about 5 to about 90 volume percent water.

57. A process according to claim 55 wherein said zinc component is present in said sorbent composition in an amount from about 25 to about 75 weight percent.

58. A process according to claim 57 wherein said zinc component is present in said sorbent composition in an amount from about 40 to about 60 weight percent.

59. A process according to claim 55 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

60. A process according to claim 59 wherein said colloidal oxide component is used in a quantity that presents an amount of metal oxide in said sorbent composition from about 1 to about 20 weight percent based on the weight of said sorbent composition.

61. A process according to claim 60 wherein said colloidal oxide component is used in a quantity that presents an amount of metal oxide in said sorbent composition from about 5 to about 15 weight percent based on the weight of said sorbent composition.

62. A process according to claim 55 wherein said metal oxide component contains a metal selected from the group consisting of magnesium, calcium, zinc and mixtures thereof.

63. A process according to claim 62 wherein the amount of metal oxide component is present in said sorbent composition in an amount in the range of about 10 to about 75 weight percent based on the weight of said sorbent composition.

64. A process according to claim 55 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

65. A process according to claim 55 wherein said sorbent composition further comprising a Group VIII metal oxide promoter.

66. A process according to claim 65 wherein said Group VIII metal oxide promoter is selected from the group consisting of cobalt oxide and nickel oxide.

67. A process according to claim 65 wherein said Group VIII metal oxide promoter is present in said sorbent composition in an amount in the range of about 1 to about 15 weight percent based on the weight of said sorbent composition.

68. A process according to claim 65 wherein said sorbent composition is subjected to a steaming treatment that comprises contacting said sorbent composition with a steam mixture that comprises water and air.

69. A process according to claim 68 wherein said steam mixture contains about 5 to about 90 volume percent water.

70. A process according to claim 65 wherein said zinc component is present in said sorbent composition in an amount from about 25 to about 75 weight percent.

71. A process according to claim 70 wherein said zinc component is present in said sorbent composition in an amount from about 40 to about 60 weight percent.

72. A process according to claim 65 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

73. A process according to claim 72 wherein said colloidal oxide component is used in a quantity that presents an amount of metal oxide in said sorbent composition from about 1 to about 20 weight percent based on the weight of said sorbent composition.

74. A process according to claim 73 wherein said colloidal oxide component is used in a quantity that presents an amount of metal oxide in said sorbent composition from about 5 to about 15 weight percent based on the weight of said sorbent composition.

75. A process according to claim 65 wherein said metal oxide component contains a metal selected from the group consisting of magnesium, calcium, zinc and mixtures thereof.

76. A process according to claim 75 wherein the amount of metal oxide component is present in said sorbent composition in an amount in the range of about 10 to the 75 weight percent based on the weight of said sorbent composition.

77. A process according to claim 65 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

78. A process to produce a sorbent composition, said process comprising:
 (a) contacting a zinc component, a colloidal oxide component, and a metal oxide component to form an agglomeration;
 (b) drying said agglomeration at a temperature in the range of about 50° C. to about 300° C. for a time period in the range of about 0.5 hours to about 4 hours to form a dried agglomeration;
 (c) calcining said dried agglomeration at a temperature in the range of about 300° C. to about 1300° C. for a time period in the range of about 0.5 to about 24 hours to form a calcined, dried composition;
 (d) subjecting said calcined, dried composition to a steaming treatment where said streaming treatment is conducted at a temperature in the range of about 100° C. to about 1100° C. for a time period in the range of about 1 to about 24 hours.

79. A process according to claim 78 wherein said steam treatment uses a steam mixture containing about 5 to about 90 volume percent water.

80. A process according to claim 78 wherein said zinc component is present in said sorbent composition in an amount from about 25 to about 75 weight percent.

81. A process according to claim 80 wherein said zinc component is present in said sorbent composition in an amount from about 40 to about 60 weight percent.

82. A process according to claim 78 wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

83. A process according to claim 82 wherein said colloidal oxide component is used in a quantity that presents an amount of metal oxide in said sorbent composition from about 1 to about 20 weight percent based on the weight of said sorbent composition.

84. A process according to claim 83 wherein said colloidal oxide component is used in a quantity that presents an amount of metal oxide in said sorbent composition from about 5 to about 15 weight percent based on the weight of said sorbent composition.

85. A process according to claim 78 wherein said metal oxide component contains a metal selected from the group consisting of magnesium, calcium, zinc and mixtures thereof.

86. A process according to claim 85 wherein the amount of metal oxide component is present in said sorbent composition in an amount in the range of about 10 to about 75 weight percent based on the weight of said sorbent composition.

87. A process according to claim 78 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

88. A process according to claim 78 wherein said sorbent composition further comprising a Group VIII metal oxide promoter.

89. A process according to claim 88 wherein said Group VIII metal oxide promoter is selected from the group consisting of cobalt oxide and nickel oxide.

90. A process according to claim 88 wherein said Group VIII metal oxide promoter is present in said sorbent composition in an amount in the range of about 1 to about 15 weight percent based on the weight of said sorbent composition.

91. A process according to claim 90 wherein said sorbent composition is subjected to a steaming treatment that comprises contacting said sorbent composition with a steam mixture that comprises water and air.

92. A process according to claim 91 wherein said steam mixture contains about 5 to about 90 volume percent water.

93. A process according to claim 88 wherein said zinc component is present in said sorbent composition in an amount from about 25 to about 75 weight percent.

94. A process according to claim 93 wherein said zinc component is present in said sorbent composition in an amount from about 40 to about 60 weight percent.

95. A process according to claim 88 wherein said colloidal oxide component has a metal oxide selected from the group consisting of alumina, silica, titania, zirconia, tin oxide, antimony oxide cerium oxide, yttrium oxide, copper oxide, iron oxide, manganese oxide, molybdenum oxide, tungsten oxide, chromium oxide, and mixtures thereof.

96. A process according to claim 95 wherein said colloidal oxide component is used in a quantity that presents an amount of metal oxide in said sorbent composition from about 1 to about 20 weight percent based on the weight of said sorbent composition.

97. A process according to claim 95 wherein said colloidal oxide component is used in a quantity that presents an amount of metal oxide in said sorbent composition from about 5 to about 15 weight percent based on the weight of said sorbent composition.

98. A process according to claim 88 wherein said metal oxide component contains a metal selected from the group consisting of magnesium, calcium, zinc and mixtures thereof.

99. A process according to claim 98 wherein the amount of metal oxide component is present in said sorbent composition in an amount in the range of about 10 to about 75 weight percent based on the weight of said sorbent composition.

100. A process according to claim 88 wherein said zinc component is present in said sorbent composition in an amount from about 25 to about 75 weight percent, and wherein said colloidal oxide component has a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said metal oxide component contains a metal selected from the group consisting of magnesium, calcium, zinc and mixtures thereof, and wherein the amount of metal oxide component present in said sorbent composition in an amount in the range of about 10 to about 75 weight percent based on the weight of said sorbent composition.

* * * * *